US009863358B2

(12) United States Patent
Becker et al.

(10) Patent No.: US 9,863,358 B2
(45) Date of Patent: Jan. 9, 2018

(54) METHOD FOR OPERATING A COMMON-RAIL SYSTEM OF A MOTOR VEHICLE HAVING A REDUNDANT COMMON-RAIL-PRESSURE SENSOR

(71) Applicant: Robert Bosch GmbH, Stuttgart (DE)

(72) Inventors: Bernd Becker, Stuttgart (DE); Rene Zieher, Edingen-Neckarhausen (DE); Andreas Sommerer, Kernen (DE); Kai Wipplinger, Esslingen (DE); Guenter Veit, Plochingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 186 days.

(21) Appl. No.: 14/783,822

(22) PCT Filed: Mar. 12, 2014

(86) PCT No.: PCT/EP2014/054782
§ 371 (c)(1),
(2) Date: Oct. 9, 2015

(87) PCT Pub. No.: WO2014/166690
PCT Pub. Date: Oct. 16, 2014

(65) Prior Publication Data
US 2016/0053706 A1  Feb. 25, 2016

(30) Foreign Application Priority Data
Apr. 11, 2013  (DE) .................. 10 2013 206 428

(51) Int. Cl.
*F02D 41/38* (2006.01)
*F02D 41/22* (2006.01)
(Continued)

(52) U.S. Cl.
CPC ......... *F02D 41/3836* (2013.01); *F02D 41/22* (2013.01); *F02D 41/222* (2013.01);
(Continued)

(58) Field of Classification Search
CPC ...... F02D 41/3836; F02D 41/26; F02D 41/22; F02D 41/222; F02D 2041/3881;
(Continued)

(56) References Cited

U.S. PATENT DOCUMENTS 3,937,087 A * 2/1976 Heggie ................ F02M 65/003
73/114.43
4,046,004 A * 9/1977 Iwasaki .................... G01L 23/18
73/114.43
(Continued)

FOREIGN PATENT DOCUMENTS

CN  101725429 A  6/2010
DE  10242128      3/2004
(Continued)

OTHER PUBLICATIONS

International Search Report for PCT/EP2014/054782, dated May 23, 2014.

*Primary Examiner* — Sizo Vilakazi
*Assistant Examiner* — Brian Kirby
(74) *Attorney, Agent, or Firm* — Norton Rose Fulbright US LLP; Gerard Messina

(57) ABSTRACT

A method for operating a common-rail system of a motor vehicle that includes a common-rail-pressure sensor configuration having at least two signal paths, and that can be operated at a maximally permissible common-rail pressure and at a minimally permissible common-rail pressure. Sensor signals are read out in each case in response to a pressure measurement in a common rail of the common-rail system via the at least two signal paths, and a signal deviation value
(Continued)

is ascertained that characterizes a deviation between the pressure values that are each determined on the basis of the sensor signals. The method includes reducing the maximally permissible common-rail pressure by a correction value to a maximally permissible emergency common-rail pressure and/or increasing the minimally permissible common-rail pressure by a correction value to a minimally permissible emergency common-rail pressure in response to the signal deviation value exceeding a predefined value.

13 Claims, 3 Drawing Sheets

(51) Int. Cl.
  *G01L 15/00*  (2006.01)
  *G05B 9/03*  (2006.01)
  *G01M 15/08*  (2006.01)
  *F02D 41/26*  (2006.01)
  *G01D 3/08*  (2006.01)

(52) U.S. Cl.
  CPC .............. *F02D 41/26* (2013.01); *G01L 15/00* (2013.01); *G01M 15/08* (2013.01); *G05B 9/03* (2013.01); *F02D 2041/223* (2013.01); *F02D 2041/227* (2013.01); *F02D 2041/3881* (2013.01); *F02D 2200/0602* (2013.01); *F02D 2400/08* (2013.01); *G01D 3/08* (2013.01)

(58) Field of Classification Search
  CPC ......... F02D 2400/08; F02D 2200/0602; F02D 2041/223; F02D 2041/227; F02D 2041/2223; G01M 15/08; G01L 15/00; G05B 9/03; G01D 3/08; F02M 65/003; F02M 63/023
  USPC ........ 701/101–105; 73/114.43; 123/456, 447
  See application file for complete search history.

(56) References Cited

U.S. PATENT DOCUMENTS

| | | | | |
|---|---|---|---|---|
| 4,507,962 A * | 4/1985 | Hitt | ............... | G01O 5/06 701/4 |
| 6,422,088 B1 * | 7/2002 | Oba | ............... | G01D 3/08 73/754 |
| 7,278,405 B2 * | 10/2007 | Takahashi | ............. | F02D 41/221 123/447 |
| 7,552,716 B2 * | 6/2009 | Osaki | ............... | F02D 41/222 123/456 |
| 8,220,322 B2 * | 7/2012 | Wang | ............... | F02D 41/222 73/114.43 |
| 8,756,985 B2 * | 6/2014 | Hermes | ............... | F02D 31/008 73/114.43 |
| 8,881,707 B2 * | 11/2014 | Katsurahara | .......... | F02D 41/221 123/198 D |
| 2002/0002964 A1 * | 1/2002 | Kohketsu | ............... | F02D 41/221 123/447 |
| 2003/0136383 A1 * | 7/2003 | Niimi | ............... | F02D 41/221 123/457 |
| 2004/0015282 A1 * | 1/2004 | Babala | ............... | G01L 15/00 701/70 |
| 2004/0079159 A1 * | 4/2004 | Muchow | ............... | G01L 9/0055 73/716 |
| 2005/0263146 A1 * | 12/2005 | Oono | ............... | F02D 41/222 123/690 |
| 2007/0044764 A1 * | 3/2007 | Osaki | ............... | F02D 41/222 123/458 |
| 2009/0019926 A1 * | 1/2009 | Sommerer | ............ | F02D 41/222 73/114.43 |
| 2009/0082941 A1 * | 3/2009 | Nakata | ............... | F02D 41/222 701/103 |
| 2010/0292941 A1 * | 11/2010 | Grasso | ............... | G01L 19/0092 702/50 |
| 2011/0016959 A1 * | 1/2011 | Hermes | ............... | F02D 41/20 73/114.51 |
| 2011/0153277 A1 * | 6/2011 | Morath | ............... | G01D 3/08 702/188 |
| 2011/0307161 A1 * | 12/2011 | Sommerer | ............ | F02D 41/222 701/103 |
| 2012/0185147 A1 * | 7/2012 | Beer | ............... | F02D 41/20 701/102 |
| 2012/0221226 A1 * | 8/2012 | Dolker | ............... | F02D 41/1401 701/103 |
| 2013/0124144 A1 * | 5/2013 | Hattar | ............... | F02D 41/222 702/183 |

FOREIGN PATENT DOCUMENTS

| | | | |
|---|---|---|---|
| DE | 102010041170 | 3/2011 | |
| DE | 202009017430 | 5/2011 | |
| EP | 1316720 | 6/2003 | |
| EP | 1316720 A1 * | 6/2003 | ........... F02D 41/222 |
| EP | 1726809 | 11/2006 | |
| JP | H086133 A * | 3/1996 | ......... F02M 63/0245 |
| JP | 2002276441 A * | 9/2002 | ............ F02D 41/22 |
| WO | WO94/01845 | 1/1994 | |

\* cited by examiner

METHOD FOR OPERATING A COMMON-RAIL SYSTEM OF A MOTOR VEHICLE HAVING A REDUNDANT COMMON-RAIL-PRESSURE SENSOR

FIELD OF THE INVENTION

The present invention relates to a method for operating a common-rail system of a motor vehicle where a common-rail-pressure sensor configuration is used, as well as to means for the implementation thereof.

BACKGROUND INFORMATION

The demands placed on modern combustion engines continuously increase—both with regard to the legal parameters for allowable emission values, as well as the rising expectations of the final consumers in terms of ride comfort, running smoothness and low fuel mileage. Meeting these requirements necessitates accurately controlling the fuel combustion, in particular the combusted fuel quantity.

In the case of an internal combustion engine having what is commonly known as a common-rail system, fuel is delivered via a high-pressure pump under high pressure into a common reservoir, referred to as a common rail, and stored therein. Fuel is passed from this common rail to the injectors. The control parameters of the injectors required for the injection are specified by an engine control unit as a function of operating points. The pressure that the fuel in the common rail is under and at which the fuel is injected into the combustion chamber, is a decisive and central quantity for the combustion.

Different approaches are known for regulating this pressure, generally referred to as common-rail pressure. The regulation may be thereby carried out either on the high-pressure side via a pressure regulating valve (PRV) on the high-pressure delivery line or on the intake side (low-pressure side) by a metering unit integrated in the high-pressure pump or provided as a separate component. What are commonly known as two-actuator systems employ both design approaches. What is generally referred to as a common-rail-pressure sensor (RPS) furnishes the actual value for the regulation in each case.

The common-rail-pressure sensor is an integral component of the common-rail system. The sensor signal received via the common-rail-pressure sensor is evaluated in the engine control unit and used for adjusting the desired nominal rail pressure and for determining the electrical actuation of the injection controller, for example of a piezo injector or of an injector having a solenoid valve, that is required for a specific injected fuel quantity. An unrecognized maladjustment or drift of the common-rail-pressure sensor leads to an incorrect injected fuel quantity and thus to degraded emissions and/or to an increase in the noise generated.

Conventional common-rail-pressure sensors include a sensor element having an evaluation circuit. A raw signal received via a sensor element is preprocessed into the sensor signal by the evaluation circuit through A/D conversion, data processing and subsequent D/A conversion. If no sensor signal is available due to an error in the signal path or on the common-rail-pressure sensor itself, this is assessed, and operation of the vehicle is continued using an emergency program (in the case of common-rail systems having a pressure regulating valve), or the engine is shut off (in the case of common-rail systems that merely have a metering unit). "Breakdowns" caused in this manner are undesirable.

For these reasons, inter alia, it is expedient to monitor the common-rail pressure, respectively the common-rail-pressure sensor by checking the plausibility of the supplied sensor signal. However, this cannot be done accurately enough and within the relevant operating range using system functions. Moreover, known methods do not make possible any satisfactory measures in cases where a common-rail-pressure sensor delivers an incorrect or implausible sensor signal.

Therefore, there is a need for ways to reliably determine a common-rail pressure in the case of a common-rail system and to initiate appropriate measures in the event of an error.

SUMMARY

The present invention provides for a method to be used for operating a common-rail system of a motor vehicle that employs a common-rail-pressure sensor configuration, as well as means for the implementation thereof including features of the independent claims. Advantageous embodiments constitute the subject matter of the dependent claims, as well as of the following description.

The present invention provides for a common-rail-pressure sensor configuration having at least two signal paths to be used during operation of a common-rail system of a motor vehicle. A common-rail-pressure sensor configuration having at least two signal paths differs from a conventional sensor having only one signal path in that redundant sensor signals are received via the at least two signal paths that enable identical pressure values to be determined in the context of an ideally accurate measurement.

Thus, redundant sensor signals are provided via the at least two signal paths. To this end, a shared sensor element (for example, in the form of a corresponding membrane, s.u.) having at least two generally known measuring bridges may be used. The at least two measuring bridges may each be integrated in one signal path. However, it may also be provided for the at least two signal paths to be acted upon by sensor signals from separate sensor elements, so that corresponding measuring bridges may, therefore, be configured on different sensor elements. Any desired combinations are possible. Thus, two or more sensor elements may be used that are each provided with two or more measuring bridges. Each of the two or more measuring bridges may be integrated in one individual signal path.

The common-rail-pressure sensor configuration may altogether assume the outward form of a conventional common-rail-pressure sensor that is provided internally with at least two sensor elements or a sensor element having two measuring bridges, or be configured in the form of two separate sensors. The subsequent clarifications relate to the first-mentioned alternative; however, the present invention is not limited thereto.

In other respects, a corresponding rail-pressure sensor configuration having at least two signal paths, such as a known common-rail-pressure sensor, may be formed, as is also explained in greater detail below. In this case, each sensor element includes one or a plurality of measuring bridges, that may be configured in the form of full bridges. As explained at the outset, the raw signals received in the common rail via the measuring bridges in response to a pressure measurement in the common rail, are preprocessed in the manner clarified at the outset. They are preprocessed in each instance through A/D conversion, data processing and subsequent D/A conversion into sensor signals that may be transmitted in analog form, for example, to a control unit and processed there by filtering and linearization.

As is generally known, the pressure value within a common-rail system ascertained from a sensor signal of a common-rail-pressure sensor is essentially used for two applications, namely for regulating and monitoring the system pressure of an injection system, it being possible for a metering unit and/or a pressure-regulating valve to be used, and/or for pressure to be measured to determine an actuation duration for the injectors (injection valves).

If no sensor signal is available due to an error in the signal path of the common-rail-pressure sensor or on the common-rail-pressure sensor itself, then, as explained at the outset, this necessitates continuing operation of the vehicle using an emergency program or shutting off the engine, which, in the latter case, inevitably leads to a breakdown. As mentioned, in the case of two-actuator systems in an emergency operating mode, it is at least possible to drive to a nearest service station ("limp home") because a controlled pressure level in the system may continue to be ensured here by the controlled actuation of the pressure-regulating valve. In such a case, the fuel metering is based on an estimated value. Here too, however, this has considerable implications for the usable pressure range and noticeably influences the injection accuracy, so that such a procedure is also not satisfactory.

For this reason, the present invention provides that the redundant rail-pressure sensor configuration be used that features at least two signal paths having evaluation circuits that are downstream therefrom in each case (see also FIG. 2). The sensor signals, that are each received via two signal paths (and the evaluation circuits downstream therefrom) are advantageously mutually inverted here. The term "inverted" is explained in greater detail with reference to the enclosed FIG. 3. Pressure values are hereby determined in the control unit, and an average value is used for the pressure regulation and for the calculation of the actuation duration. However, the method is also suited for non-inverted, i.e., parallel propagating sensor signals. Here as well, a sensor drift, respectively implausibility may be recognized, and an appropriate reaction may follow.

As is also elucidated with reference to the enclosed figures, a pressure averaging is carried out on the basis of at least two sensor signals. By itself, however, a pressure averaging does not inevitably lead to a satisfactory value that may be used for controlling the common-rail system, because the pressure values obtained possibly deviate greatly from one another. This is the case, for example, when a signal path is functioning properly (thus, indicates a "correct" value, possibly with a certain deviation), and an incorrect sensor signal is received over the other signal path, or when the signal path is defective.

Therefore, the present invention provides for the sensor signals to be read out in each case over the at least two signal paths of the "redundant" common-rail-pressure sensor configuration; for a signal deviation value to be ascertained that characterizes a signal deviation of at least two of the sensor signals; and for the maximally permissible common-rail pressure to be reduced by a correction value to a maximally permissible emergency common-rail pressure; and/or for the minimally permissible common-rail pressure to be increased by a correction value to a minimally permissible emergency rail pressure when the signal deviation value exceeds a predefined value. In this context, the "signal deviation value" may represent a deviation of the sensor signals themselves and/or a deviation therefrom of the obtained pressure values.

The method according to the present invention is mainly described here and in the following with reference to exactly two signal paths. However, it is fundamentally also suited for a greater number of signal paths as well. In this case, signal deviation values, correction values, etc., are ascertained for more than two signal paths, in particular two at any one time. As clarified, exactly two signal paths may be used; the signal deviation value then being ascertained, for example, as a differential amount between the sensor signals or from pressure values derived herefrom, and half of the differential amount being used as a correction value.

An inventive common-rail system of a motor vehicle is provided for implementing the method using appropriate means. In particular, a common-rail system of this kind has a control unit that is adapted for carrying out the elucidated method.

A processing unit according to the present invention, for example, a control unit of a motor vehicle, is adapted, in particular in terms of software engineering, for carrying out a method according to the present invention.

A software implementation of the method is also advantageous since this entails especially low costs, particularly when an executing control unit is also used for other tasks and is, therefore, present anyway. Suitable data media for providing the computer program include, in particular, diskettes, hard drives, flash memories, EEPROMs, CD ROMs, DVDs, inter alia. A program may also be downloaded over computer networks (Internet, intranet, etc.).

Other advantages and embodiments of the present invention are derived from the description and the appended drawing.

It is understood that the aforementioned features and those still to be described in the following may be used not only in the particular stated combinations, but also in other combinations or alone, without departing from the scope of the present invention.

The present invention is schematically illustrated in the drawing with reference to an exemplary embodiment and is described in detail in the following with reference to the drawing.

DETAILED DESCRIPTION

Figure 1:
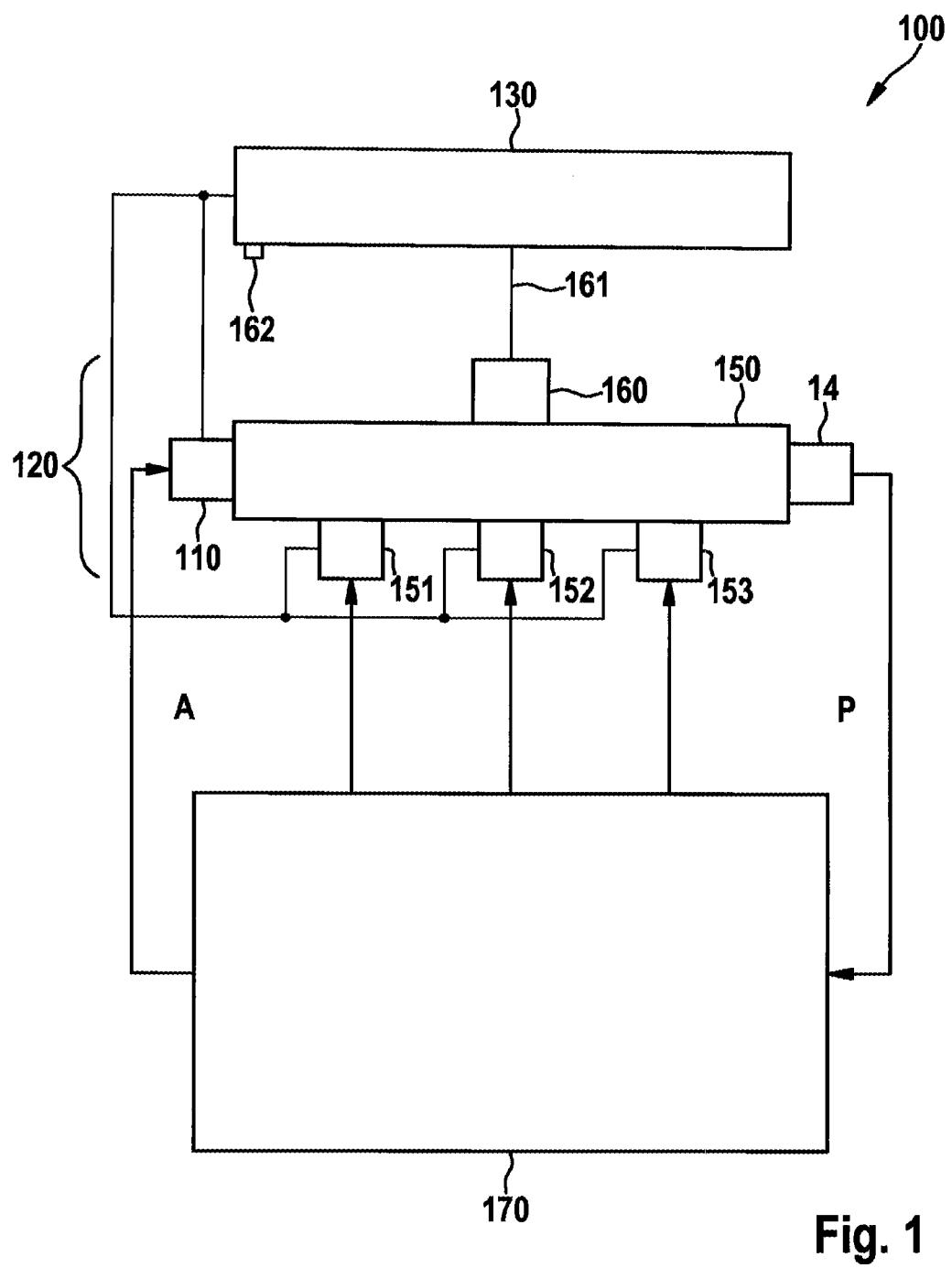
FIG. 1 shows a block diagram of the essential elements of a common-rail system, as may underlie the present invention.

Denoted by 100 and illustrated as a block diagram, FIG. 1 shows the essential elements of a common-rail system that may underlie the present invention. Common-rail system 100 includes a high-pressure zone 120 and a low-pressure zone 130 in which fuel is present in each case at a different pressure. In the high-pressure zone, for example, a pressure of 1,500 bar-2,000 bar is customary, whereas a pressure of up to 10 bar may prevail in the low-pressure zone.

Components of high pressure zone 120 are essentially a high-pressure delivery line 150 (what is generally referred to as the common rail, respectively rail) and injectors 151, 152 and 153 for metering the highly pressurized fuel into one or a plurality of cylinders (not shown) of a combustion engine.

To regulate the high pressure (line pressure), inter alia, a processing unit configured as an engine control unit 170 is provided that actuates a control element 110 for controlling line pressure P by an actuation signal A. Control element 110 may be a pressure-regulating valve (PRV) that connects high-pressure zone 120 to low-pressure zone 130, and/or a controllable high-pressure pump that delivers the fuel from low-pressure zone 130 into high-pressure zone 120. By appropriately actuating a solenoid valve (generally referred to as a metering unit) provided on the high-pressure pump, the delivered quantity and thus the pressure prevailing in the high-pressure zone may be controlled. Low-pressure zone 130 (for example, in the fuel tank, main filter or in the high-pressure pump) is equipped with a temperature sensor 162 that measures the temperature of the fuel.

Common-rail-pressure sensor 14 records current value P of the pressure prevailing in the high-pressure zone, also referred to here as common-rail pressure. A signal indicative thereof from common-rail-pressure sensor 14 arrives at control unit 170. As a function of various other signals (not shown), the control unit calculates actuation signals to act upon injectors 151, 152 and 153. These injectors meter a specific fuel quantity to the combustion engine as a function of the particular actuation signal at a particular point in time. The injectors are connected to low-pressure zone 130 via return lines through which excess fuel flows off. Merely three injectors and three cylinders are shown in the figure. However, the described procedure may be used for any desired number of injectors and/or cylinders.

Moreover, a pressure-regulating valve 160 is provided that connects high-pressure zone 120 to low-pressure zone 130 via a return flow 161. Normally, this valve is closed, and the connection is interrupted. In response to the pressure prevailing in high-pressure zone 120 (i.e., the common-rail pressure) increasing beyond an activation pressure value (of 2,000 bar, for example), pressure limiting valve 160 opens, and the common-rail pressure drops to a holding pressure (for example, 800 bar).

Figure 2:
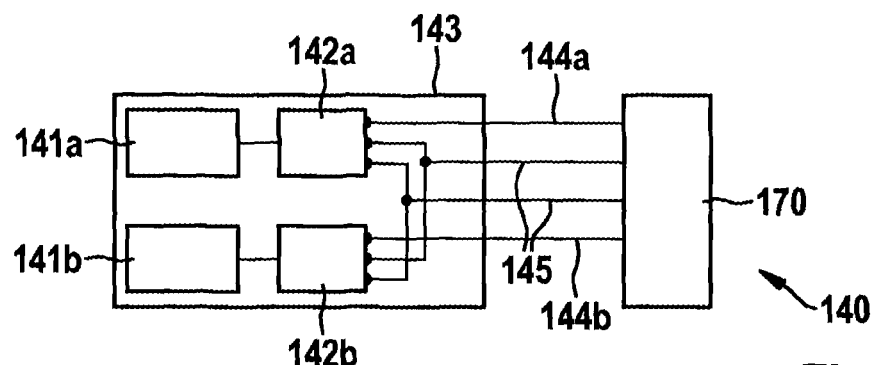
FIG. 2 shows a block diagram of the essential elements of a common-rail pressure configuration that may be used in accordance with the present invention.

FIG. 2 shows a block diagram of the essential elements of a common-rail pressure sensor configuration that may be used in accordance with the present invention and is denoted as a whole by 140. Common-rail-pressure sensor configuration 140 is connected to a control unit 170 whose function was already previously clarified.

In the principle of operation thereof and the measuring principle used, common-rail-pressure sensor configuration 140 may correspond to known common-rail-pressure sensors 14. Common-rail-pressure sensor configuration 140 has a housing, for example, that is schematically illustrated here and is denoted by 143. In the case of conventional common-rail-pressure sensors, one single sensor element having a metal diaphragm, for example, is provided in housing 143. The fuel pressure acts on the metal diaphragm. A semiconductor pressure sensor is mounted on the side of the metal diaphragm opposing the acting fuel pressure. It may be designed as a piezoelectric sensor, for example. A known measuring bridge is associated with the pressure sensor.

In common-rail-pressure sensor configuration 140, that may be used in accordance with the present invention, a corresponding sensor element (i.e., a metal diaphragm) or a corresponding measuring bridge is provided in duplicate. The signal paths resulting herefrom are denoted here by 141a and 141b. Thus, signal paths 141a and 141b each include at least one measuring bridge that is configured in the form of a full bridge, for example. As explained, two measuring bridges may be configured on one sensor element.

The raw signals of signal paths 141a and 141b are preprocessed through an A/D conversion, data processing and subsequent D/A conversion, for example. The preprocessed raw signals are subsequently transmitted as sensor signals 144a and 144b, preferably in analog form, to control unit 170 and further processed there. To preprocess the raw signals, as explained, signal paths 141a and 141b are connected via corresponding lines to evaluation circuits 142a and 142b where it may be a question of application-specific, integrated circuits (ASIC), for example. Evaluation circuits 142a and 142b are adapted for generating corresponding signals 144a and 144b where, as explained, it may preferably be a question of analog signals. In this regard, common-rail-pressure sensor configuration 140 is connected via corresponding lines to control unit 170. A further line pair 145 is provided that includes a supply line and a ground line. It is understood that common-rail-pressure sensor configuration 140 may alternatively also have another ground connection.

Thus, common-rail-pressure sensor configuration 140 that may be used in accordance with the present invention altogether features two signal paths having corresponding full bridges and two evaluation circuits. It is preferably provided that output sensor signals 144a and 144b be generated as mutually inverted signals. Corresponding sensor signals 144a and 144b may be recorded in control unit 170. Pressure values may be ascertained from sensor signals 144a and 144b. A value that has been averaged accordingly from sensor signals 144a and 144b, respectively from corresponding pressure values may be used for regulating pressure and for calculating the actuation duration.

Figure 3:
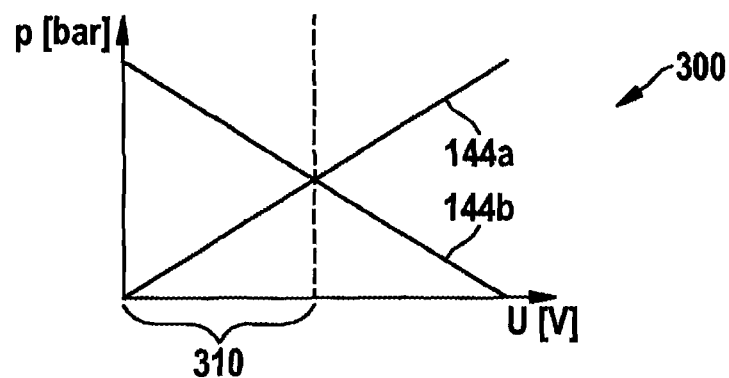
FIG. 3 illustrates sensor signals that are obtainable using the common-rail-pressure sensor configuration in accordance with FIG. 2.

In a diagram 300, FIG. 3 illustrates sensor signals that are obtainable using common-rail-pressure sensor configuration 140 in accordance with FIG. 2. In diagram 300, a voltage U is plotted in volts on the abscissa relative to a pressure p in bar on the ordinate. For the sake of clarity, the two sensor signals 144a and 144b are shown in a linear representation; it is understood, however, that such signals do not necessarily have to be in linear form. Therefore, at least one of the axes of diagram 300 may also be present in logarithmic, respectively in another non-linear form. At a minimum pressure p, sensor signal 144a yields a minimum voltage u and, at a maximum pressure p, a maximum voltage U. Conversely—in this sense, sensor signals 144a and 144b are "inverted"—at a minimum pressure p, sensor signal 144b yields a maximum voltage U and, at a maximum pressure p, a maximum voltage U.

In the context of the present invention, an asymmetric output stage is advantageously used to pull the corresponding sensor signals to a preferred potential. The diagnosis is preferably made following a respective linearization based on the level of the pressure. This makes it possible to immediately discern in response to both signal voltages being identical, that a cable harness error must be present. Since the potential is defined on the basis of the evaluation stage, the pressure signal may be robustly used up to half of the characteristic curve (compare FIG. 3, region 310). This makes it possible to ensure a pressure regulation and a proper metering. In other words, the present invention advantageously functions with pressure values that are ascertained from particular sensor signals 141a and 141b. However, other values derived from the sensor signals may also be used. For such derived values (for example, pressure values), variables, respectively reference numerals a and b are briefly used in the following.

Figure 4:
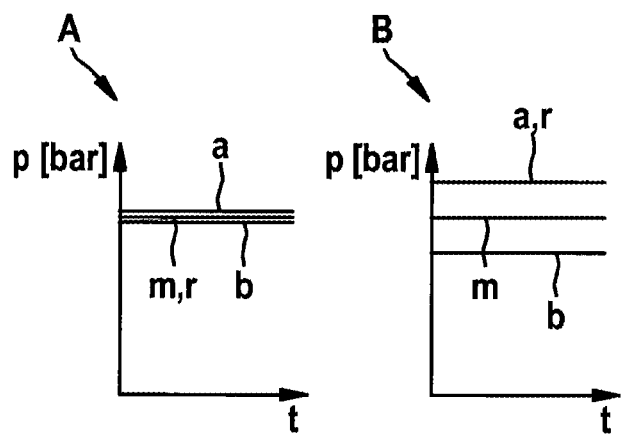
FIG. 4 illustrates a recognition of a drift of a common-rail-pressure sensor configuration in accordance with one specific embodiment of the present invention.

FIG. 4 illustrates the recognition of a sensor drift in accordance with a specific embodiment of the present invention. In this case, two diagrams A and B are shown, in each of which a pressure p in bar is plotted on the ordinate over a time t on the abscissa. In diagram A, both signal paths function properly, respectively the evaluation circuits associated therewith function properly; thus there is also no cable error. In FIG. 4 and subsequent FIG. 5, a denotes a pressure value that may be ascertained from a signal 144a (compare FIG. 3). In response to constant common-rail pressure, pressure value a is constant over time. Correspondingly, b denotes a pressure value that is derived from a sensor signal 144b. It is also constant in response to a constant common-rail pressure. m denotes the mean pressure value of these two pressure values a and b. In the illustrated example, mean pressure value m corresponds in the idealized representation to exactly real pressure value r that is present in the common rail. In the context of an ideal measuring quality of the signal paths, real pressure value r would correspond exactly to the corresponding individual pressure values a and b, which would then be identical. However, since this is never the case in reality, it may be assumed that pressure values a and b are only exactly identical when an error is present. In addition, in reality, average value m represents exactly real value r only in exceptional cases, since sensor signals a and b hardly exhibit an identical deviation from real value r (positive and negative).

In diagram B, a situation is shown where pressure value b deviates considerably from real pressure value r. In this case, pressure value b lies appreciably below real pressure value r. On the other hand, value a corresponds (with a deviation that is not shown) to real pressure value r. If merely a mean value is generated in this case between pressure values a and b (mean pressure value m), and this mean pressure value m is used for regulating the common-rail system, damage could possibly be caused because real pressure value r, which acts upon the common-rail system, lies above the supposedly correct pressure value (indicated by mean pressure value m).

Figure 5:
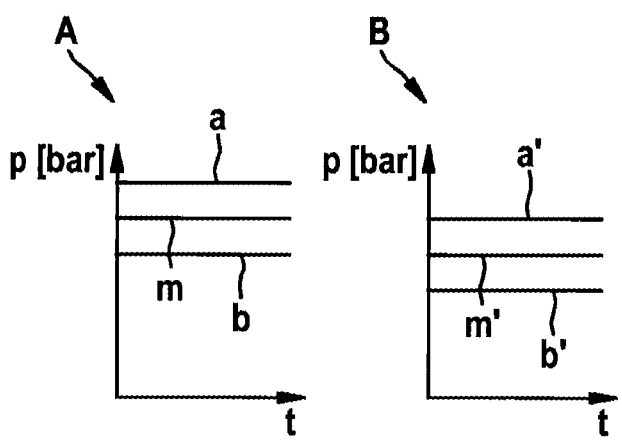
FIG. 5 illustrates a compensation of a drift of a common-rail-pressure sensor configuration in accordance with one specific embodiment of the present invention.

For that reason, the present invention provides for compensating for such a sensor drift, as is shown in greater detail in FIG. 5. Diagrams and signal designations in FIG. 5 thereby essentially correspond to the diagrams and signal designations in FIG. 4. There is no further description of real pressure value r here because real pressure value r is not known in real systems, where merely sensor signals of a corresponding common-rail-pressure sensor configuration 140 are available. Pressure value a, pressure value b, and mean pressure value m are shown in diagram A. However, it is not known whether mean pressure value m, pressure value a, or pressure value b corresponds to a real value. Therefore, a plausibility checking method is provided that is clarified in greater detail in the following:

If a signal deviation value $A$, in this case a differential amount of between pressure values a and b, $\Delta=|a-b|$ resides outside of a permissible range, a common-rail-pressure signal is recognized as being implausible. It is initially not possible to ascertain information here as to which of the two underlying sensor signals 144a, 144b, respectively which pressure value a, b, respectively which signal path is incorrect. For clarification, reference is again made to FIG. 4 including diagrams A and B. In this case, diagram A shows a case where signal deviation value $\Delta=|a-b|$ still resides within the permissible range; whereas diagram B illustrates the case where signal deviation value $\Delta=|a-b|$ resides outside of the permissible range.

Depending on the signal deviation of the incorrect pressure value (positive or negative) from real pressure value r (that is not known), real pressure r in the common-rail system is greater or lower than pressure mean value $m=|a-b|/2$. Since it is not known which pressure value is incorrect, the system must be placed in a secure state. This means that the maximally permissible system pressure must not be exceeded; at the same time, however, in the case of an error, the minimum system pressure must be ensured in order to permit a best possible availability, at least, however, a "limp home," thus an emergency operation until the nearest service station is reached.

In this case, the maximally permissible common-rail pressure is reduced by half of the difference of signal deviation value $\Delta$ in order not to produce any system overpressure. The maximally permissible common-rail pressure is denoted here by $p_{max}$, a correspondingly reduced pressure in the case of an error (referred to here as maximally permissible common-rail pressure) by $p_{max,E}$. It holds here that $p_{max,E}=p_{max}-|a-b|/2$.

Accordingly, the minimally permissible common-rail pressure is reduced by half of the difference of signal deviation value $\Delta$ in order to ensure the valve opening pressure of the injectors. The minimally permissible common-rail pressure is denoted here by $p_{min}$; a correspondingly reduced pressure in the case of an error (referred to here as minimally permissible common-rail pressure) by $p_{min,E}$. It holds here that $p_{min,E}=p_{min}+|a-b|/2$.

A corresponding drop in pressure is illustrated in diagram B of FIG. 5. The maximally permissible common-rail pressure is lowered here to the point where corresponding pressure values, denoted here by a', b' and m' are no longer able to exceed the maximally permissible pressure value. Even if real pressure value r is supposed to correspond to pressure value a' in the extreme case, it is ensured that maximally permissible common-rail pressure is not exceeded. This also applies correspondingly to the minimally permissible common-rail pressure.

What is claimed is:

1. A method for operating a common-rail system of a motor vehicle, the method comprising:

reading out sensor signals in each case in response to a pressure measurement in a common rail of the common-rail system via at least two signal paths of a common-rail-pressure sensor configuration, wherein the common-rail system includes the common-rail-pressure sensor configuration having the at least two signal paths, and wherein the common rail system is operable at a target maximally permissible common-rail pressure and at a target minimally permissible common-rail pressure;

ascertaining a signal deviation value that characterizes a deviation between pressure values that are determined based on the sensor signals; and in response to the signal deviation exceeding a predefined value, at least one of:

reducing the target maximally permissible common-rail pressure by a correction value to another target maximally permissible emergency common-rail pressure, and increasing the target minimally permissible common-rail pressure by the correction value to another target minimally permissible emergency common-rail pressure;

wherein a differential amount is ascertained as the signal deviation value between the two pressure values that are determined based on the sensor signals of two of the signal paths, in each case, half of the differential amount between the two pressure values being used as the correction value.

2. The method as recited in claim 1, where the sensor signals of two of the signal paths are determined in the form of two mutually inverted voltage signals, which each indicate a pressure in the common rail and from which the pressure values are ascertained.

3. The method as recited in claim 2, where the two voltage signals are received in each case using evaluation circuits associated with the signal paths.

4. The method as recited in claim 1, where the common-rail-pressure sensor configuration has exactly two signal paths.

5. The method as recited in claim 1, where a common-rail-pressure sensor having the two signal paths is used as the common-rail-pressure sensor configuration.

6. The method as recited in claim 1, where the sensor signals are at least one of averaged and linearized.

7. The method as recited in claim 1, where the motor vehicle is switched to an emergency operation in response to the signal deviation value exceeding the predefined value.

8. The method as recited in claim 1, wherein the method is used for a single-or two-actuator common-rail system.

9. A common-rail system of a motor vehicle, comprising:
a common rail;
a common-rail-pressure sensor configuration;
at least two signal paths, the system being operable at a target maximally permissible common-rail pressure and at a target minimally permissible common-rail pressure;
an arrangement for reading out sensor signals, in each case in response to a pressure measurement in the common rail via the at least two signal paths; and
an arrangement for ascertaining a signal deviation value that characterizes a deviation between pressure values that are each determined based on the sensor signals; and
an arrangement for, in response to the signal deviation value exceeding a predefined value, at least one of:
reducing the target maximally permissible common-rail pressure by a correction value to another target maximally permissible emergency common-rail pressure, and
increasing the target minimally permissible common-rail pressure by the correction value to another minimally permissible emergency common-rail pressure;
wherein a differential amount is ascertained as the signal deviation value between the two pressure values that are determined based on the sensor signals of two of the signal paths, in each case, half of the differential amount between the two pressure values being used as the correction value.

10. The common-rail system as recited in claim 9, where each of the at least two signal paths of the common-rail-pressure sensor configuration includes a measuring bridge, the measuring bridges of at least two of the at least two sensor signals being configured on the same or different sensor elements.

11. A processing unit for operating a common-rail system of a motor vehicle, comprising:

a processing arrangement configured for performing the following:
reading out sensor signals in each case in response to a pressure measurement in a common rail of the common-rail system via at least two signal paths of a common-rail-pressure sensor configuration, wherein the common-rail system includes the common-rail-pressure sensor configuration having the at least two signal paths, and wherein the common rail system is operable at a target maximally permissible common-rail pressure and at a target minimally permissible common-rail pressure;
ascertaining a signal deviation value that characterizes a deviation between pressure values that are determined based on the sensor signals; and
in response to the signal deviation exceeding a predefined value, at least one of:
reducing the target maximally permissible common-rail pressure by a correction value to another target maximally permissible emergency common-rail pressure, and
increasing the target minimally permissible common-rail pressure by the correction value to another target minimally permissible emergency common-rail pressures;
wherein a differential amount is ascertained as the signal deviation value between the two pressure values that are determined based on the sensor signals of two of the signal paths, in each case, half of the differential amount between the two pressure values being used as the correction value.

12. The processing unit as recited in claim 11, wherein the processing unit includes a control unit for the common-rail system.

13. A computer readable medium having a computer program, which is executable by a processor, comprising:
a program code arrangement having program code for operating a common-rail system of a motor vehicle that includes a common-rail-pressure sensor configuration having at least two signal paths, and that can be operated at a target maximally permissible common-rail pressure and at a target minimally permissible common-rail pressure, by performing the following:
reading out sensor signals in each case in response to a pressure measurement in a common rail of the common-rail system via the at least two signal paths;
ascertaining a signal deviation value that characterizes a deviation between pressure values that are determined based on the sensor signals; and
in response to the signal deviation exceeding a predefined value, at least one of:
reducing the target maximally permissible common-rail pressure by a correction value to another target maximally permissible emergency common-rail pressure, and
increasing the target minimally permissible common-rail pressure by the correction value to another target minimally permissible emergency common-rail pressure;
wherein a differential amount is ascertained as the signal deviation value between the two pressure values that are determined based on the sensor signals of two of the signal paths, in each case, half of the differential amount between the two pressure values being used as the correction value.

* * * * *